United States Patent [19]
Glass

[11] Patent Number: 5,815,534
[45] Date of Patent: Sep. 29, 1998

[54] DETECTOR OF CARRIER LOSS IN A FAX MODEM

[75] Inventor: William Glass, Seyssinet Pariset, France

[73] Assignee: SGS-Thomson Microelectronics S.A., Saint Genis, France

[21] Appl. No.: 527,055

[22] Filed: Sep. 12, 1995

[30] Foreign Application Priority Data

Sep. 14, 1994 [FR] France ................................. 94 11212

[51] Int. Cl.$^6$ ........................ H04L 27/14; H04L 27/16; H04L 27/22
[52] U.S. Cl. ........................ 375/326; 375/317; 375/338; 358/443
[58] Field of Search .................................. 375/317, 326, 375/338, 222; 379/100; 358/443, 462, 437, 411, 469

[56] References Cited

U.S. PATENT DOCUMENTS

| | | | |
|---|---|---|---|
| 3,990,048 | 11/1976 | Kanitz et al. | 340/825.71 |
| 4,387,401 | 6/1983 | Henderson et al. | 358/193.1 |
| 4,554,508 | 11/1985 | Haque | 329/101 |
| 5,181,226 | 1/1993 | Cantwell | 375/200 |
| 5,260,974 | 11/1993 | Johnson et al. | 375/76 |
| 5,596,418 | 1/1997 | Strolle et al. | 358/316 |
| 5,598,441 | 1/1997 | Kroeger et al. | 375/344 |

FOREIGN PATENT DOCUMENTS 2 275 395  8/1994  United Kingdom ............ H04L 27/38

OTHER PUBLICATIONS

French Search Report from French Patent Application Serial No. 94 11212, filed Sep. 14, 1994.
Patent Abstracts of Japan, vol. 018, No. 218 (E–1539), Apr. 19, 1994 & JP–A–06 014062 (Mitsubishi Electric Corp.).
Patent Abstracts of Japan, vol. 012, No. 207 (E–621). Jun. 14, 1988 & JP–A–63 006935 (Toshiba Corp.).

*Primary Examiner*—Stephen Chin
*Assistant Examiner*—Bryan Webster
*Attorney, Agent, or Firm*—Wolf, Greenfield & Sacks, P.C.; James H. Morris; Brett N. Dorny

[57] ABSTRACT

A detector of a carrier loss in a modem receiver of a fax transmission of a document, of the type includes a first calculator of the receive signal and a first comparator of this energy with respect to a threshold. The detector further includes means for adapting said threshold between each page of the transmitted document.

38 Claims, 1 Drawing Sheet

DETECTOR OF CARRIER LOSS IN A FAX MODEM

BACKGROUND OF THE INVENTION

1. Field of the Invention

The present invention relates to the field of digital modulators/demodulators (modems) and more specifically to the operation of detecting a carrier loss in a modem used for transmitting faxes.

2. Discussion of the Related Art

In a modem using a signal processor, the data to be transmitted is digitally coded from a number of possible symbols, then transmitted in the form of samples of portions of a carrier modulated, for example, in phase and amplitude, then converted into analog signals.

In the case of fax transmissions, the modems operate in two-way alternate mode (half-duplex) and are likely to transmit and receive signals corresponding to two types of modulation. A phase and amplitude modulation (QAM) or a differential phase modulation (DPH) of a carrier is used for data transmission. Frequency shift keying (FSK) is used to exchange information as to the communication, especially to acknowledge the reception of each page transmitted by fax. Accordingly, the switching of a QAM or DPH modulation towards FSK modulation must happen at the end of each page of the document transmitted by fax. A step of detection of an end of a page is the detection of the loss of a carrier of the QAM or DPH modulation.

On the receive side, the level of the receive signal is used to detect the carrier loss. The detector indicates two states, respectively ON and OFF, output, the loss of the carrier, which is characterized by an attenuation of the level of the receive signal.

FIG. 1 shows an example of a conventional carrier loss detector. The detector includes a magnitude calculation circuit 1 including a circuit 2 for determining the absolute value (supplying the absolute value of the amplitude receive signal Rx), the output of which is sent to an averaging block 3 constituted by a recursive first-order low-pass filter with a zero cut-off frequency. The signal Rx received by the calculation circuit 1 corresponds to the signal received by the modem after digitization. Averaging block 3 is used to smooth the ripple at the output of circuit 2 as well as to avoid an ill-timed switching of the detector. A comparator 4 of the detector receives at its positive input the output of averaging block 3 which constitutes the output of calculation circuit 1. A negative input of comparator 4 receives a predetermined threshold value THRSH with which the magnitude of the receive signal is to be compared. The output of comparator 4 issues a detect signal DETECT with two states (ON and OFF) indicating the presence or the absence of a carrier.

A drawback of this type of detector is that the characteristics of the transmission line between two modems can substantially modify the level of the receive signal. The modifications of the level of the receive signal can be in a range of, for example, between 0 dBm and −48 dBm. If, for example for threshold THRSH, a level of −24 dBm is used, any receive signal with a level lower than −24 dBm will be interpreted as a carrier loss. Conversely, if noise is intermixed with the signal, the detector cannot detect the carrier loss.

Japanese patent application No. 06 014 062 describes another example of a carrier loss detector using a memorized threshold based on the energy of the receive signal. Such a detector is particularly complicated and necessitates additional means to control the threshold memorization. Furthermore, it does not allow an adaptation of an existing modem having a carrier loss detector such as represented in FIG. 1 without involving large changes of the modem receiver.

Another drawback of such a detector is that it may generate detection errors because of the response time of the used filter (band-pass).

SUMMARY OF THE INVENTION

An object of the invention aims at overcoming these drawbacks by proposing a carrier loss detector which is both fast and reliable.

Another object of the invention is to provide such a detector which allows an adaptation of an existing carrier loss detector and/or existing modem without involving large changes of the modem receiver.

To achieve these objects, the present invention provides a carrier loss detector in a modem receiver of a document transmission by fax, including:

a first magnitude calculation circuit for the receive signal, a first comparator of this magnitude with respect to a threshold, and means for achieving an adaptation of said threshold between each page of the transmitted document.

According to an embodiment of the invention, said means include a register for memorizing a magnitude threshold which corresponds to the magnitude of the receive signal during a sequence of determined signals, and a switch having the purpose of controlling the memorization of the magnitude of the receive signal coming from the first calculation circuit at the occurrence of the sequence of determined signals, said sequence being chosen to exhibit signals with a calibrated amplitude.

According to an embodiment of the invention, a coefficient lower than one is assigned to the magnitude to be memorized, by means of a first multiplier interposed between an output of the first calculation circuit and a memorization input of the register.

According to an embodiment of the invention, the value of the multiplying coefficient is selected so that the value of the memorized threshold be attenuated with respect to the output of the first calculation circuit by a value corresponding at least to the maximum ripple amplitude that can be exhibited by the first calculation circuit output.

In one aspect, the invention is directed toward a circuit for determining the loss of a carrier signal at a device input that receives a transmission signal. The circuit includes a magnitude determination circuit that receives the transmission signal and generates a magnitude value of the transmission signal, a comparator that receives the magnitude value of the transmission signal and compares the magnitude value against a threshold value, and a threshold adjusting circuit that receives the transmission signal and adjusts the threshold value to a multiple of the magnitude value of the transmission signal when a predetermined sequence of signals in the transmission signal is received. The comparator outputs a carrier loss signal when the first magnitude value is less than the threshold value.

In another aspect, the invention is directed toward a modem. The modem includes means for receiving digitized facsimile transmissions having a plurality of pages, means for outputting the plurality of pages of the digitized facsimile transmissions, a magnitude determination circuit that receives the transmission signal and generates a magnitude value of the transmission signal, a comparator that receives the magnitude value of the transmission signal and compares the magnitude value of the transmission signal against a threshold value, and a threshold adjusting circuit that receives the transmission signal and adjusts the threshold value to a multiple of the first magnitude value when a predetermined sequence of signals in the transmission signal is received. The comparator outputs a carrier loss signal when the first magnitude value is less than the threshold value.

In another aspect, the invention is directed toward a method for determining an end of a facsimile transmission by loss of a carrier signal of the facsimile transmission in a device capable of receiving facsimile transmissions having a plurality of pages. The method includes the steps of comparing a magnitude value of the facsimile transmissions to a threshold value to determine loss of the carrier signal when the threshold value is greater than the magnitude value and adjusting the first threshold value to a multiple of the magnitude value of the received signal, when a predetermined sequence of signals occurs in the transmission signal.

In another aspect, the invention is directed toward a circuit for determining a loss of a carrier signal at a device input that receives a transmission signal having a plurality of pages.

The circuit comprises magnitude determination means for determining a magnitude value of the transmission signal, comparing means for issuing a carrier loss signal indicating the loss of the carrier signal based upon a comparison of the magnitude of the transmission signal to a threshold value, and threshold adjusting means for adjusting the threshold value when a sequence of predetermined signals occurs in the transmission signal.

According to an embodiment of the invention, the detector is associated to an identification device for the sequence of determined signals, which issues a control signal to said switch, said sequence having a frequency spectrum of two determined frequencies.

According to an embodiment of the invention, said identification device includes a band-pass filter, associated with a second magnitude calculation circuit, an output of which is sent via a second multiplier on a first input of a second comparator, and a low-pass filter, associated with a third magnitude calculation circuit, an output of which is sent via a third multiplier on a second input of the second comparator.

According to an embodiment of the invention, said identification device includes a notch filter, associated with a second magnitude calculation circuit, an output of which is sent on a first input of a second comparator, a second input of the second comparator receiving the output of a third magnitude calculation circuit, the input of which directly receives said receive signal.

According to an embodiment of the invention, a multiplier by a predetermined coefficient is interposed between the output of each calculation circuit of the identification device and the input of the second comparator with which said calculation circuit is associated.

According to an embodiment of the invention, the coefficient of the multiplier associated with the second calculation circuit is greater than the coefficient of the multiplier associated with the third calculation circuit.

According to an embodiment of the invention, each magnitude calculation circuit comprises a circuit for determining the absolute value of the magnitude of the receive signal and a digital recursive first order low-pass filter with a zero cut-off frequency.

The foregoing and other objects, features and advantages of the present invention will be discussed in the following description of specific embodiments, taken in conjunction with the accompanying drawings but not limited by them.

DETAILED DESCRIPTION

Figure 2:
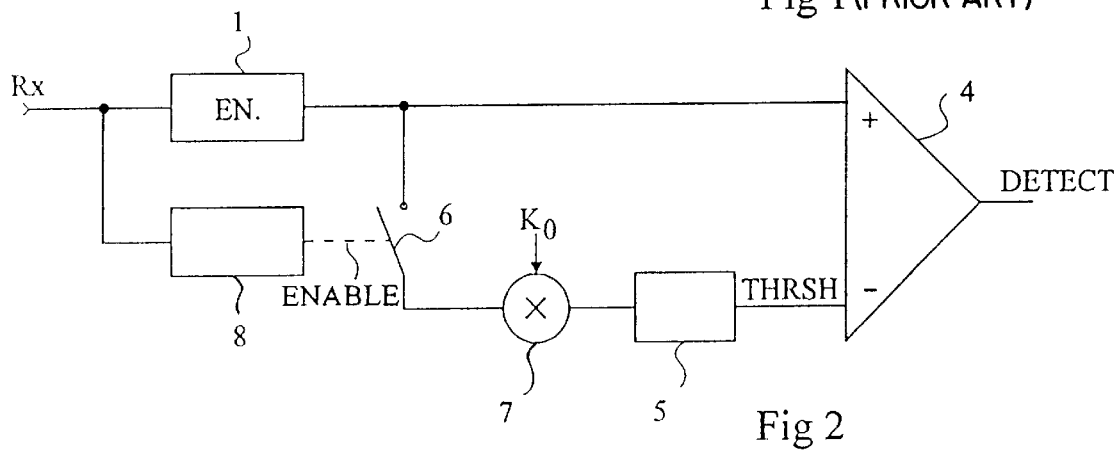
FIG. 2 shows an embodiment of a carrier loss detector according to the invention.

A carrier loss detector according to the invention, as shown in FIG. 2, includes a comparator 4 of the level of the receive signal Rx, which is supplied to it on a positive input by a magnitude calculation circuit 1 constituted by a circuit for determining the absolute value of the amplitude of the receive signal and an averaging block. According to the invention, for the sake of simplicity, a magnitude calculation circuit is preferred to an energy calculation circuit squaring the level of the receive signal. Comparator 4 receives on its negative input a threshold value THRSH coming from a register 5.

Figure 1:
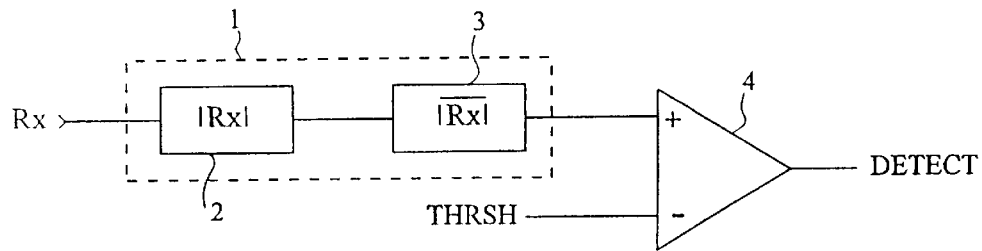
FIG. 1, previously described, discloses a conventional detector.

Referring to FIG. 2, the carrier loss detector according to the invention is marked off from the conventional detector shown in FIG. 1 by the presence of a switch 6 that periodically causes storage of, in register 5, the level present at the output of magnitude calculation circuit 1, multiplied by a coefficient K0 by means of a multiplier 7.

The off position of switch 6 is the position shown in FIG. 2.

A characteristic of the present invention is that the threshold and the current level to be mutually compared are both obtained from the same magnitude calculation circuit 1. Thereby, the operation of a detector according to the invention is not affected by eventual changes in the operation of the calculation circuit because such changes cannot cause differences between the calculation of the threshold and the calculation of the current level. Furthermore, it makes the operation of the detector independent of manufacturing limits of the calculation circuit. This is an advantage with respect to detectors (as, for example, in Japanese patent application No. 06 014 062) using separate circuits for calculating the threshold and the current level.

An advantage of the present invention is that the detector takes into account the noise likely to be mixed to the receive signal for calculating the threshold and the current value.

At regular intervals during the switching, threshold THRSH is adapted, taking as a new value the magnitude of the receive signal Rx during a determined sequence which is selected so as to correspond to the transmission of a sequence of signals having predetermined amplitudes. The selection of such a sequence is based on the fact that the level of the receive signal Rx during this sequence, multiplied by a coefficient K0 lower than 1, can then represent a threshold THRSH which corresponds to no data transmission.

This constitutes a feature of the present invention, which is to propose a carrier loss detector having an auto-adaptive threshold THRSH. In order to achieve this, use is made of the fact that significant changes mainly occur between communications, due to different lines; changes are generally slight during a single communication.

Hence, an adaptation of threshold THRSH of the carrier loss detector occurs between each communication, and preferably between each transmitted page.

Most advantageously, use is made of predetermined signals which are transmitted during a training phase, present between each transmission of a document page, to perform said adaptation of threshold THRSH.

Indeed, before each transmission of a document page, an intermediate training phase is performed. The CCITT recommendations provide a training procedure determined for each transmission standard by determining the type of signals to be transmitted and the maximum duration of the training procedure. In the case of standard V27, for example, which is one of the standards used for faxing, the training procedure is divided into five segments.

The five segments correspond to a particular transmission of predetermined signals.

A first segment includes a pure carrier (unmodulated) transmitted at the frequency of the data transmission carrier, for example, 1800 Hz for standard V27.

A second segment includes no transmission for a certain period.

A third segment includes a signal modulated by a given frequency, in phase and in 180° out of phase. The frequency is, for example, 1600 Hz for standard V27. In the frequency domain, this corresponds to transmitting two pure frequencies, one at 1000 Hz, the other at 2600 Hz.

A fourth segment includes a random scrambled signal in a frequency range. For standard V27, said frequency range is included between 1000 and 2600 Hz.

A fifth segment includes a scrambled signal encoded in a predetermined way.

The invention proposes to use the third segment to achieve the adaptation of the carrier loss detection threshold THRSH. The selection of segment three is motivated by the fact that the first two segments are not always present. As a matter of fact, they are only present in training phases relative to modems with echo cancellation modules. As for the fourth and fifth segments, they include a modulation of the carrier close to a modulation by data symbols and are thus not easily distinguished from the receive signals during the transmission of a document page.

In contrast, segment three has the advantage of being already detected by the modem, particularly in order to adjust an automatic gain command. Thus, an ENABLE signal indicating the presence of said segment is already available in the modem, coming from a device 8 for identifying segment three, which can then be used as a control signal for threshold adaptation switch 6.

An advantage of the present invention is that, by using, as a control signal, a signal already existing in the modem, the detector of an existing modem, for example as shown in FIG. 1, can be simply modified to obtain a detector according to the invention. Indeed, switch 6, multiplier 7 and register 5 could be inserted between the output of calculation circuit 1 and the negative input of comparator 4 without other modifications of the circuit shown in FIG. 1.

It will be understood that, for such an adaptation, no modification of the calculation circuit 1 is required because the same calculation circuit 1 is used for obtaining the threshold and the current value.

The selection of the value of coefficient K0 of multiplier 7 depends on the transmission standard. A value represents, for a value of threshold THRSH obtained in the presence of segment three, an attenuation of the level of the receive signal Rx and corresponds to the transmission loss. The attenuation level obtained should be higher than the maximum amplitude of the ripple exhibited by the averaging block output of magnitude calculation circuit 1, so as to avoid ill-timed switching processes.

As an example, an attenuation of about 6 dB can be chosen for standard V27 ter, that is, a coefficient K0 of about 0.5. For standard V27, coefficient K0 can be about 0.25, representing an attenuation of about 12 dB. For standard V17, coefficient K0 can be about 0.125, representing an attenuation of about 18 dB.

Figure 3:
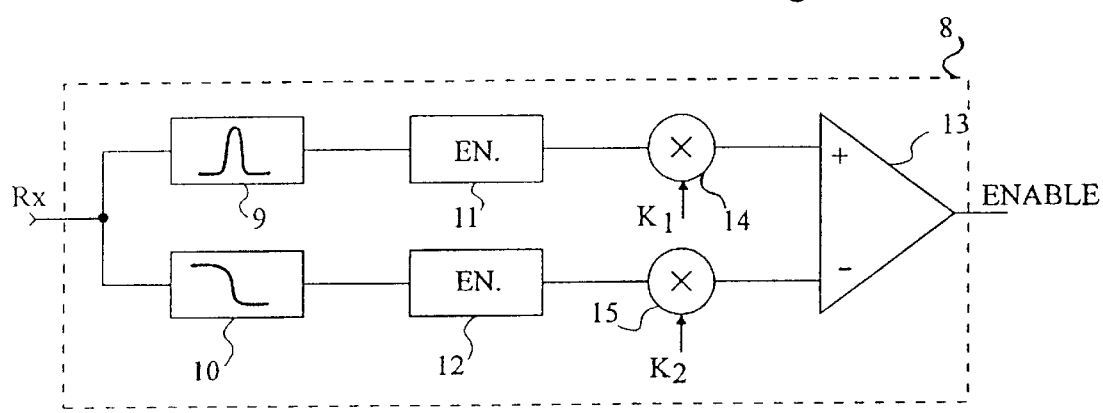
FIG. 3 shows an embodiment of a control circuit of a switch for storing the threshold of the detector of FIG. 2.

FIG. 3 shows a conventional embodiment of a device 8 for identifying segment three. The ENABLE output is used according to the invention to control switch 6. The circuit includes a band-pass filter 9 and a low-pass filter 10, each receiving the signal Rx. As for the detector shown in FIG. 2, the signal Rx received by filters 9 and 10 corresponds to the signal received by the modem after a digitization in an analog/digital converter (not shown). Each filter 9, 10 is followed by a magnitude calculation circuit 11, 12, respectively. A comparator 13 receives, on a first input, the output of multiplier 14 multiplying the output of calculation circuit 11 by a coefficient K1 and, on a second input, the output of a multiplier 15 multiplying the output of calculation circuit 12 by a coefficient K2. The output of comparator 13 supplies a two-state ENABLE signal indicating the presence or the absence of segment three in the receive signal Rx. Coefficient K1 of multiplier 14 is approximately twice as big as coefficient K2 of multiplier 15. For standard V27 ter, band-pass filter 9 is a narrow filter centered on a frequency of 1000 Hz and low-pass filter 10 has a cut-off at 1760 Hz.

Thus, when segment three is present, that is, two pure frequencies at 1000 Hz and 2600 Hz, the first input of comparator 13 is at a higher level than its second input. Indeed, twice the output level of band-pass filter 9 is greater than the output level of low-pass filter 10.

In presence of a modulated signal (flat spectrum between 1000 Hz and 2600 Hz), or of noise on the line, the output level of low-pass filter 10 is greater than twice the output level of band-pass filter 9, due to the narrowness of the latter.

However, it will be preferred, according to the invention, to use a device for identifying segment three which is reliable and fast, even in the case of a short duration of the transmission of segment three. Indeed, the duration of the transmission of segment three on the transmission line depends on the standard. More precisely, the duration of the third segment depends on the state in which the modems are found, between two states which respectively correspond to an initial training (at the beginning of the transmission) or an intermediate training (between each page). For standard V27 ter, the intermediate training state, called state a, has a duration of 14 symbol intervals. The initial training state, called state b, has a duration of 50 symbol intervals. The durations are expressed in numbers of symbol intervals, or bauds, since they depend on the transmission rate in bits per second, standard V27 ter providing two transmission speeds (1200 bauds or 2400 bits/s and 1600 bauds or 4800 bits/s).

If a conventional detector of segment three correctly operates for a segment three of long duration (for example, state b of standard V27 ter which corresponds to 50 bauds, that is, 31.25 ms), it does not allow reliable detection of segment three if said segment three is only transmitted during a short period (for example, state a of standard V27 ter which corresponds to 14 bauds, that is, 8.75 ms). This is due to the response time of band-pass filter 1, the time constant of which is greater than 14 bauds, because of its narrowness.

As a matter of fact, a digital band-pass filter is conventionally a recursive, at least second order, filter constituted by integrators, multipliers and delay elements (shift registers). The structure and the behavior of a filter of this type have been discussed by P.-M. BEAUFILS and M. RAMI in "Le filtrage numérique", pages 216 to 224.

A drawback of this type of filter is that obtaining a narrow band-pass filter, which is necessary in order to prevent false detections of segment three, leads to a slow filter.

Figure 4:
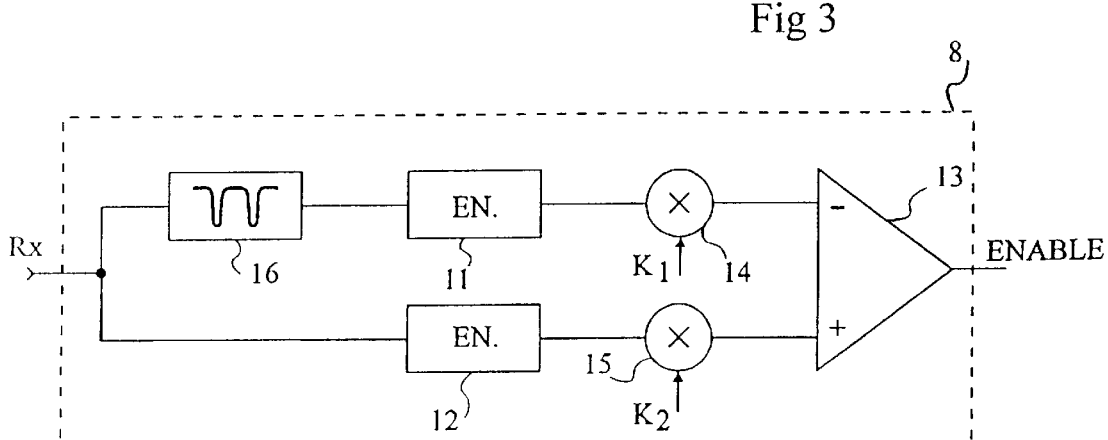
FIG. 4 shows an alternative embodiment of the control circuit shown in FIG. 3.

Thus, according to an alternative embodiment, the device for identifying segment three, the ENABLE signal of which controls switch 6, is constituted as shown in FIG. 4.

Referring to FIG. 4, the recognition device according to the invention includes a notch filter 16 on to which the signal Rx received by the modem after being digitized is sent. The output of notch filter 16 is sent on a first magnitude calculation circuit 11 having its output linked to a first input of a comparator 13. The receive signal Rx is also directly sent on a second magnitude calculation circuit 12 having its output linked to a second input of comparator 13. Preferably, multipliers 14, 15 are interposed between the output of each calculation circuit 11, 12 and the input of the comparator with which it is associated. The multipliers 14, 15 multiply by a positive coefficient lower than 1, respectively K1 and K2, K1 being greater than K2, to each output of calculation circuit 11, 12.

Notch filter 16 has two cut-off frequencies which correspond to the two frequencies present in segment three, that is, for standard V27 ter, 1000 Hz and 2600 Hz.

An advantage of using such a notch filter 16 is that it is easy to implement in the form of a non recursive digital filter having a low time constant. This is not the case for a band-pass filter, since a non recursive filter includes only zeros (frequencies for which the attenuation is infinite). The number of delay elements of the filter should thus be multiplied to surround the central frequency with a great number of zeros (cut-off frequencies), since what is aimed at is obtaining a determined non cut-off frequency, which would lead to a very high signal propagation delay in the filter. Conversely, for a notch filter, the determined frequencies are precisely cut-off frequencies, that is, zeros.

By means of a device such as that shown in FIG. 4, the presence of segment three brings about a high level at the output of calculation circuit 12 which receives signal Rx straight through, and a very low level at the output of calculation circuit 11, since the two frequencies have been cut-off by filter 16. Here, the noise likely to be intermixed with the receive signal Rx has no effect, since its contribution is practically the same on the two calculation circuits 11, 12 because the notch filters are relatively narrow.

In the absence of segment three, that is, in the presence of a modulated signal, of noise, or of a segment three corresponding to another transmission standard, the outputs of the two calculation circuits 11 and 12 are essentially at the same levels.

The coefficients of multipliers 14 and 15 are preferably selected in order for the output level of calculation circuit 12 to be divided by two with respect to the output level of calculation circuit 11. This allows to easily discriminate the two possible cases on comparator 13, one of the inputs of the comparator (the first one in the absence of segment three, the second one in the presence of segment three) thus always having one level higher than the other.

The magnitude calculation circuits 11, 12 (FIG. 3 or 4) are, as the calculation circuit 1 (FIG. 2), constituted by a circuit for determining the absolute value of the amplitude of the receive signal and, forming an averaging block, a digital recursive first order low-pass filter with a zero cut-off frequency.

An advantage of using the recognition device shown in FIG. 4 is that, in the implementation of a modem receiver, calculation circuits 1 and 11 could be merged. Indeed, they receive the same signal (the receive signal after digitization) and they issue the same information (an average value of the absolute value of the amplitude of the receive signal).

Thus, each time a segment three appears, threshold THRSH of comparator 4, which will be used to detect the end of the next page of the transmitted document, is adapted. A particularly reliable carrier loss detector, even in case of changes in the characteristics of the line during a document transmission, has thus been made available.

The time constant of averaging block 3 can be chosen in such a way that it allows both a sufficiently fast calculation of the magnitude of the receive signal when segment three is present and to comply with the constraint related to the maximum amplitude of the ripple at the averaging block output, in order to avoid a false detection.

Of course, the present invention is likely to have various alterations and modifications which will readily occur to those skilled in the art. Particularly, each of the described components can be replaced by one or several elements assuming the same function.

Moreover, whereas some of the foregoing explanations have been given for the sake of clarity by using a vocabulary which sometimes corresponds to an analog operation, it will be clear to those skilled in the art that all the elements of the circuit according to the present invention deal with digital signals and that the components of the circuit illustrated in a material form can correspond, in the practice, to software implementations.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalent thereto.

What is claimed is:

1. A carrier loss detector in a modem receiving digitized facsimile transmissions of a document having a plurality of pages, comprising:

a first magnitude calculation circuit receiving a transmission signal and generating a first magnitude value of the transmission signal;

a first comparator receiving said first magnitude value of the transmission signal and a threshold value and outputting a carrier loss signal when the threshold value is greater than the first magnitude value; and a threshold adjusting means for adjusting said threshold value between each page of the transmitted document.

2. A carrier loss detector in a modem receiving digitized facsimile transmissions of a document having a plurality of pages of claim 1, wherein said threshold adjusting means includes:

a register for storing the threshold and outputting the threshold to the first comparator; and a switch coupling the register to the first magnitude calculation circuit in order to store the first magnitude value when a predetermined sequence of signals occurs in said transmission.

3. A carrier loss detector in a modem receiving digitized facsimile transmissions having a plurality of pages of claim 2, wherein the threshold adjusting means further includes a first multiplier interposed between the switch and the register to multiply the first magnitude value by a first constant less than one.

4. A carrier loss detector in a modem receiving digitized facsimile transmissions of a document having a plurality of pages of claim 3, wherein the first magnitude value signal has a ripple, the first coefficient having a value such that the first threshold value is greater than the maximum amplitude of the ripple.

5. A carrier loss detector in a modem receiving digitized facsimile transmissions of a document having a plurality of pages of claim 2, wherein the threshold adjusting means further includes an identification device for identifying the predetermined sequence of signals and outputting a control signal to said switch, wherein said predetermined sequence of signals includes a frequency spectrum of two predetermined frequencies.

6. A carrier loss detector in a modem receiving digitized facsimile transmissions of a document having a plurality of pages of claim 5, wherein the identification device includes:
   a band-pass filter for outputting a first filtered signal of the transmission;
   a second magnitude calculation circuit receiving the first filtered signal and generating a second magnitude value;
   a second multiplier for multiplying the second magnitude value by a second coefficient;
   a low-pass filter for outputting a second filtered signal of the transmission;
   a third magnitude calculation circuit receiving the second filtered signal and generating a third magnitude value; and
   a third multiplier for multiplying the third magnitude value by a third coefficient;
   a second comparator outputting the control signal based upon a comparison of the multiplied second magnitude value and the multiplied third magnitude value.

7. A carrier loss detector in a modem receiving digitized facsimile transmissions of a document having a plurality of pages of claim 5, wherein the identification device includes:
   a notch-filter having notches at two predetermined frequencies for outputting a first filtered signal of the transmission;
   a second magnitude calculation circuit receiving the first filtered signal and generating a second magnitude value;
   a third magnitude calculation circuit receiving the transmission and generating a third magnitude value; and
   a second comparator outputting the control signal based upon a comparison of the second magnitude value and the third magnitude value.

8. A carrier loss detector in a modem receiving digitized facsimile transmissions of a document having a plurality of pages of claim 7, wherein the identification device further includes:
   a second multiplier circuit coupled between the second magnitude calculation circuit and the second comparator for multiplying the second magnitude value by a second coefficient;
   a third multiplier circuit coupled between the third magnitude calculation circuit and the second comparator for multiplying the third magnitude value by a third coefficient, and
   wherein the second comparator outputs the control signal based upon a comparison of the multiplied second magnitude value and the multiplied third magnitude value.

9. A carrier loss detector in a modem receiving digitized facsimile transmissions having a plurality of pages of claim 6, wherein the second coefficient is greater than the third coefficient.

10. A carrier loss detector in a modem receiving digitized facsimile transmissions having a plurality of pages of claim 8, wherein the second coefficient is greater than the third coefficient.

11. A circuit for determining loss of a carrier signal at a device input that receives a transmission signal, comprising:
   a first energy determination circuit receiving the transmission signal and generating a first energy value of the transmission signal;
   a first comparator receiving the first energy value and comparing the first energy value against a threshold value, the first comparator outputting a carrier loss signal when the first energy value is less than the threshold value; and
   a threshold adjusting circuit receiving the transmission signal and adjusting the threshold value to a multiple of the first energy value when a predetermined sequence of signals in the transmission signal is received.

12. The circuit of claim 11, wherein the threshold adjusting circuit includes:
   a storage circuit that stores the first energy value of the transmission signal and provides the first energy value as the threshold value to the first comparator; and
   a switch coupling the storage circuit to the first energy determination circuit when the predetermined sequence of signals is received.

13. The circuit of claim 12, wherein the threshold adjusting circuit further includes a first multiplier coupled between the switch and the storage circuit for multiplying the first energy value by a first coefficient less than one.

14. The circuit of claim 13, wherein a multiple of the first energy value of the transmission signal has a ripple having a maximum amplitude, and wherein the first coefficient is approximately equal to a value such that the first threshold is greater than the maximum amplitude of the ripple.

15. The circuit of claim 11, wherein the threshold adjusting circuit includes a triggering circuit receiving the transmission signal and outputting a triggering signal to the switch when the predetermined sequence of signals is received, and wherein the switch couples the storage circuit to the first energy determination circuit when the triggering signal is received by the switch.

16. The circuit of claim 15, wherein the triggering circuit includes:
   a band-pass filter for outputting a first filtered signal of the transmission signal;
   a second energy determination circuit receiving the first filtered signal and generating a second energy value;
   a second multiplier for multiplying the second energy value by a second coefficient;
   a low-pass filter for outputting a second filtered signal of the transmission signal;
   a third energy calculation circuit receiving the second filtered signal and generating a third energy value; and
   a third multiplier for multiplying the third energy value by a third coefficient;
   a second comparator outputting the triggering signal based upon a comparison of the second energy value multiplied by the second coefficient and the third energy value multiplied by the third coefficient.

17. The circuit of claim 16, wherein the second coefficient is approximately equal to twice the third coefficient.

18. The circuit of claim 15, wherein the triggering circuit includes:
   a notch-filter having notches at two predetermined frequencies for outputting a first filtered signal;
   a second energy determination circuit receiving the first filtered signal and generating a second energy value;
   a third energy determination circuit receiving the transmission and generating a third energy value; and
   a second comparator outputting the triggering signal based upon a comparison of the second energy value and the third energy value.

19. The circuit of claim 18, wherein the triggering circuit includes:
   a second multiplier coupled between the second energy determination circuit and the second comparator for multiplying the second energy value by a second coefficient; and
   a third multiplier coupled between the third energy determination circuit and the second comparator for multiplying the second energy value by a third coefficient less than the second coefficient, and
   wherein the second comparator outputs the control signal based upon a comparison of the multiplied second energy value and the multiplied third energy value.

20. The circuit of claim 19, wherein the third coefficient has a value approximately equal to half the second coefficient.

21. A modem comprising:
   means for receiving digitized facsimile transmissions having a plurality of pages;
   means for outputting the plurality of pages of the digitized facsimile transmissions; and
   a circuit for determining an end of a facsimile transmission by loss of a carrier signal of the digitized facsimile transmissions, including;
   a first energy determination circuit receiving the transmission signal and generating a first energy value of the transmission signal;
   a first comparator receiving the first energy value and comparing the first energy value against a threshold value, the first comparator outputting a carrier loss signal when the first energy value is less than the threshold value; and
   a threshold adjusting circuit receiving the transmission signal and adjusting the threshold value to a multiple of the first energy value when a predetermined sequence of signals in the transmission signal is received.

22. The modem of claim 21, wherein the threshold adjusting circuit includes:
   a storage circuit that stores the first energy value of the transmission signal and provides the first energy value as the threshold value to the first comparator; and
   a switch coupling the storage circuit to the first energy determination circuit when the predetermined sequence of signals is received.

23. The modem of claim 22, wherein the threshold adjusting circuit further includes a first multiplier coupled between the switch and the storage circuit for multiplying the first energy value by a first coefficient less than one.

24. The modem of claim 23, wherein a multiple of the first energy value of the transmission signal has a ripple having a maximum amplitude, and wherein the first coefficient is approximately equal to a value such that the first threshold is greater than the maximum amplitude of the ripple.

25. The modem of claim 21, wherein the threshold adjusting circuit includes a triggering circuit receiving the transmission signal and outputting a triggering signal to the switch when the predetermined sequence of signals is received, and wherein the switch couples the storage circuit to the first energy determination circuit when the triggering signal is received by the switch.

26. The modem of claim 25, wherein the triggering circuit includes:
   a band-pass filter for outputting a first filtered signal of the transmission signal;
   a second energy determination circuit receiving the first filtered signal and generating a second energy value;
   a second multiplier for multiplying the second energy value by a second coefficient;
   a low-pass filter for outputting a second filtered signal of the transmission signal;
   a third energy calculation circuit receiving the second filtered signal and generating a third energy value; and
   a third multiplier for multiplying the third energy value by a third coefficient;
   a second comparator outputting the triggering signal based upon a comparison of the second energy value multiplied by the second coefficient and the third energy value multiplied by the third coefficient.

27. The modem of claim 26, wherein the second coefficient is approximately equal to twice the third coefficient.

28. The modem of claim 25, wherein the triggering circuit includes:
   a notch-filter having notches at two predetermined frequencies for outputting a first filtered signal;
   a second energy determination circuit receiving the first filtered signal and generating a second energy value;
   a third energy determination circuit receiving the transmission and generating a third energy value; and
   a second comparator outputting the triggering signal based upon a comparison of the second energy value and the third energy value.

29. The modem of claim 28, wherein the triggering circuit includes:
   a second multiplier coupled between the second energy determination circuit and the second comparator for multiplying the second energy value by a second coefficient; and
   a third multiplier coupled between the third energy determination circuit and the second comparator for multiplying the second energy value by a third coefficient less than the second coefficient, and
   wherein the second comparator outputs the control signal based upon a comparison of the multiplied second energy value and the multiplied third energy value.

30. The modem of claim 29, wherein the third coefficient has a value approximately equal to half the second coefficient.

31. A method for determining an end of a facsimile transmission by loss of a carrier signal of the facsimile transmission in a device capable of receiving facsimile transmissions having a plurality of pages, comprising the steps of:
   (A) comparing an energy value of the facsimile transmission to a threshold value to determine loss of the carrier signal when the threshold value is greater than the energy value; and
   (B) adjusting the first threshold value to a multiple of the energy value of the received signal, when a predetermined sequence of signals occurs in the transmission signal.

32. The method of claim 31, wherein step (B) includes a step of determining when the predetermined sequence of signals occurs in the transmission signal.

33. The method of claim 31, wherein step (B) includes a step of storing a multiple of the energy value of the transmission signal as an adjusted threshold value.

34. The method of claim 31, wherein the predetermined sequence of signals represents a period of time occurring between the transmission of pages of the plurality of pages.

35. A circuit for determining loss of a carrier signal at a device input that receives a transmission signal having a plurality of pages, comprising:

energy determination means for determining the energy of the transmission signal;

comparing means for issuing a carrier loss signal indicating the loss of the carrier signal based upon a comparison of the energy of the transmission signal to a threshold value; and threshold adjusting means for adjusting the threshold value when a sequence of predetermined signals occurs in the transmission signal.

36. The circuit of claim 35, wherein the threshold adjusting means includes means for determining when the predetermined sequence of signals occurs in the transmission signal.

37. The circuit of claim 35, wherein the threshold adjusting means includes means for storing a multiple of the energy value as an adjusted threshold value.

38. The circuit of claim 35, wherein the threshold adjusting means includes means for only adjusting the threshold value during a period of time occurring between the transmission of pages of the plurality of pages.

* * * * *